Feb. 15, 1944.  F. NEWTON  2,342,008
ELECTRIC REGULATOR
Filed Feb. 21, 1942
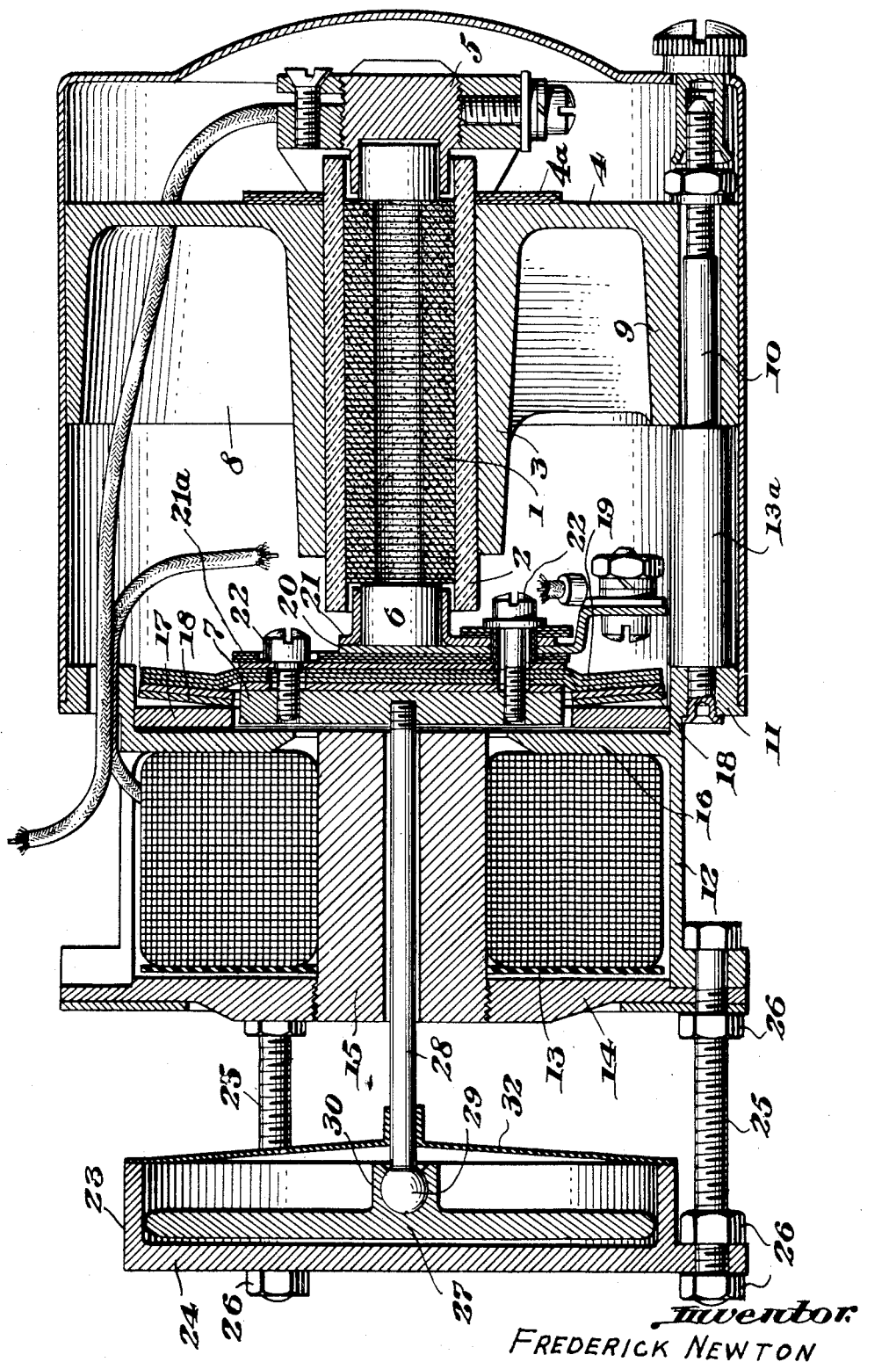
Inventor.
FREDERICK NEWTON
By Young, Emery & Thompson attys.

Patented Feb. 15, 1944

2,342,008

UNITED STATES PATENT OFFICE 2,342,008

ELECTRIC REGULATOR

Frederick Newton, Derby, England, assignor to Newton Brothers (Derby) Limited, Derby, England Application February 21, 1942, Serial No. 431,865

10 Claims. (Cl. 201—51)

This invention relates to electric regulating devices and more particularly has reference to devices for smoothing or damping vibrations produced by current fluctuations.

In a voltage regulator of the type described in my Patent No. 2,268,718, the nature of the actuating magnet-spring system is aperiodic but the ratio of the differential forces to the weight of the moving parts is so high that when the regulator is used in alternating current systems and is subjected to the action of rectified alternating current the armature of the magnet is sensitive to the alternating current component of the rectified alternating current and on lower frequencies may have an objectionable vibration.

Various electrical methods of smoothing this rectified alternating current are available such as a tuned filter or a condenser placed across the operating electromagnet coil of the regulator. These have disadvantages, the first in that it is effective only over a limited frequency variation, the second in that to be effective as a smoothing medium it must be of a value to seriously affect the "time constant" of the control circuit.

Further if the full alternating current voltage is rectified and smoothed by a condenser the resulting direct current voltage is sometimes inconveniently high and the regulation still would not be entirely independent of frequency change.

While the vibration which occurs without any smoothing device on low frequencies may be inconvenient the forces producing this are small, being a function of the ripple in the flux in the control magnet, and the magnitude of the ripple is only such that the rate of change of flux multiplied by the number of turns on the control magnet coil equals the A. C. component of the rectified voltage.

Where these regulators are used for the control of alternators the alternator armature reaction and reactance may be such as to cause a considerable transient rise in pressure on the removal of load and for this reason it is usual to provide a mechanical stop to limit the travel of the regulator armature towards the high resistance position of the carbon pile at which position it also is most desirable to provide effective damping of impressed vibration.

An object of this invention is to provide a device for avoiding the above pointed out disadvantages.

Another object of this invention is to provide a damping device for damping vibrations of an electromagnetic armature associated with an automatic regulator.

A further object of this invention is to provide a combined damping and stop device for damping the vibration of and limiting the displacement of an electromagnet armature of an automatic regulator.

Still another object of this invention is to provide a pneumatic dash pot for damping the vibration of an electromagnet armature of a control device in which the piston abuts against one end of a cylinder with no clearance.

A still further object of this invention is to provide a dash pot comprising a shallow cylinder the diameter of which is several times the axial length thereof, open at one end and closed at its other end, a disc-like piston therein and movable against the closed end of the cylinder with no clearance therebetween, and a piston rod connected to the piston for limited universal movement to permit the piston to have limited wabbling action in the cylinder.

With these and other objects in view which may appear incident to my improvements, the invention comprises the parts and combinations hereinafter described and illustrated in the drawing.

In the single figure of the drawing there is shown a vertical sectional view of a carbon pile regulator embodying the principles of the present invention.

As shown in the drawing, the controller comprises a carbon pile 1 consisting of a plurality of discs mounted in a ceramic tube 2 which in turn is positioned in the boss 3 of the frame 4. A fixed terminal 5 is mounted on one end of the carbon pile and is anchored to the frame 4 through suitable insulating material 4a. A movable terminal 6 engages the other end of the carbon pile and is attached to the armature 7 of an electromagnet as will be hereinafter described.

Frame 4 has a skirt-like portion 8 in which a series of circumferentially spaced bosses 9 are provided and through which bolts 10 extend.

By means of bolts 10 the frame 4 is attached to the flange 11 of the housing 12 of electromagnet 13, spacers 13a serving to maintain the housing 12 and frame 4 in proper spaced relation.

Secured to one end of housing 12 is a plate 14 in which the core 15 is threadedly mounted. Flange 16 extends inwardly from the other end of the housing 12 to a point adjacent the free end of the core and cooperates therewith to form pole pieces for attraction of the armature 7.

An annular abutment 17 is positioned against the flange 11 and mounted thereon is a bimetallic ring 18 of somewhat conical formation the conicity of which varies with the temperature. Resting on the conical bimetal ring 18 are the ends of a spring or series of springs 19 which wrap upon the ring 18 as an abutment as the spring is stressed.

Secured to the spring member 19 is the armature 7 and the contact members 20, 21 are attached to the armature 7 and spring member. For this purpose screws 22 extend through openings in the spring member 18 and contact members 20, 21 and are threaded into openings in the armature 7.

Suitable reinforcing spacing and insulating plates 21a are positioned between parts of the armature spring contact assembly.

The spring member is assembled to exert a compressure force on the carbon pile and the action of the electromagnet opposes the spring action as described in my above-mentioned patent. The electrical connections are made as described in the above-mentioned patent.

To provide a mechanical stop for the armature and a damping means therefor, there is attached to magnet housing 12 a shallow cylinder 23 having a closed end 24 and an open end facing the magnet housing. Threaded rods or bolts 25 having several nuts 26 thereon serve to adjustably attach the cylinder 23 to the magnet housing 12.

A disc-like piston 27 is positioned in the cylinder and the piston and cylinder are constructed so that there will be no clearance between the piston and cylinder end 24 when the piston is at the end of its stroke. For this purpose the contacting surfaces of the piston and cylinder end 24 have identical surfaces.

Piston 27 is actuated by the magnet armature 7 through a piston rod 28 which is provided with a ball 29 at one end fitting into a socket 30 on the side of the piston. The socket is formed to retain the ball 29 therein and to permit limited universal movement between the piston rod and piston.

Piston rod 28 extends through a bore in the magnet core 15 and is threadedly or otherwise secured to the armature 7. Thus the cylinder being fixed to the magnet housing 12 and the piston being secured to the armature 7, movements of the piston relative to the cylinder will correspond to movement of the armature, spring and carbon-pile-actuator assembly relative to the magnet poles and frame. Any restriction of the movement of the piston will correspondingly restrict movement of the assembly of the armature and its associated parts.

It should be noted that the circumferential edge of the piston is rounded to permit the piston to wabble in the cylinder. For this purpose the radius of curvature of the edge should be not greater than the radius of the piston. The construction is such as to permit the piston to wabble because it is found that better contact between the face of the piston and the cylinder end 24 is thereby provided. The piston is never moved very far away from the cylinder end 24 since the displacement of the armature 7 is small. Also since the axial displacement of the armature and piston rod is rather small, the diameter of the piston and cylinder is comparatively high so that the amount of air displaced or drawn into the space between the piston and cylinder end 24 for a given displacement will be a high percentage of the maximum volume to produce a high damping action.

In some instances one side edge of the piston may contact the cylinder end 24 and due to the ball and socket joint between the piston and piston rod the damping action will be produced with the same result, the piston then acting in hinge fashion.

The pneumatic device described serves well as a damping means because the contained air between the piston and cylinder end reduces to almost zero as the "stop" position is approached thereby offering increasing resistance to vibrational movement when and where this is the most required.

The device is purely mechanical and can be fitted as a standard attachment to a regulator irrespective of any electrical conditions or requirements and while leaving the naturally short time constant of the regulator control circuit unaffected, it provides a certain amount of pneumatic damping, useful in the case of difficult regulation problems.

The diameter of the piston would in most cases be of the order of two to four times the diameter of the core of the electromagnet, and the diametrical clearance between the plate and cylinder could be within ordinary manufacturing tolerances.

Actually due to the closeness of the piston to the end wall the damping effect is good even when the vibration of the moving elements is of very small amplitude.

Adjustment of the space between the piston and cylinder end is effected by adjusting the position of the cylinder relative to the magnet housing 12. This likewise sets the stop position limiting the movement of the armature 7 and associated parts.

A light fabric diaphragm 32 without force deflection nature may be fitted over the open end of the cylinder to protect the same against dust and other foreign material which may impair the operation of the device.

Having described my invention, I claim:

1. In an electromagnetic-spring actuated carbon pile regulator having an electromagnet, a carbon pile having one end fixed relative to the the magnet, a spring engaging the other and movable end of the carbon pile to compress the same, and an armature connected to the movable end of the carbon pile and spring for opposing the action of the spring upon energization of the electromagnet, a dash pot comprising a cylinder closed at one end, means for mounting the cylinder in fixed relation to the electromagnet, a piston in said cylinder, said piston being positioned in close proximity to the closed end of the cylinder and having no clearance between the same and the closed end of the cylinder when at the end of its stroke, and a piston rod connecting the piston to the armature.

2. In an electromagnetic-spring actuated carbon pile regulator having an electromagnet, a carbon pile having one end fixed relative to the magnet, a spring engaging the other and movable end of the carbon pile to compress the same, and an armature connected to the movable end of the carbon pile and spring for opposing the action of the spring upon energization of the electromagnet, a dash pot comprising a cylinder closed at one end, adjustable means for mounting the cylinder in adjusted fixed relation to the electromagnet, a piston in said cylinder, said piston being positioned in close proximity to the closed end of the cylinder and having no clearance between the same and the closed end of the cylinder when at the end of its stroke, and a piston rod connecting the piston to the armature.

3. In an electromagnetic-spring actuated carbon pile regulator having an electromagnet, a carbon pile having one end fixed relative to the magnet, a spring engaging the other and movable end of the carbon pile to compress the same, and an armature connected to the movable end of the carbon pile and spring for opposing the action of the spring upon energization of the electromagnet, a dash pot comprising a cylinder closed at one end, means for mounting the cylinder in fixed relation to the electromagnet, a piston in said cylinder having its circumferential edge of rounded configuration to permit wabbling in the cylinder, said piston being positioned in close proximity to the closed end of the cylinder and having no clearance between the same and the closed end of the cylinder when at the end of its stroke, and a piston rod connecting the piston to the armature.

4. In an electromagnetic-spring actuated carbon pile regulator having an electromagnet, a carbon pile having one end fixed relative to the magnet, a spring engaging the other and movable end of the carbon pile to compress the same, and an armature connected to the movable end of the carbon pile and spring for opposing the action of the spring upon energizatiton of the electromagnet, a dash pot comprising a cylinder closed at one end, adjustable means for mounting the cylinder in adjusted fixed relation to the electromagnet, a piston in said cylinder having its circumferential edge of rounded configuration to permit wabbling in the cylinder, said piston being positioned in close proximity to the closed end of the cylinder and having no clearance between the same and the closed end of the cylinder when at the end of its stroke, and a piston rod connecting the piston to the armature.

5. In an electromagnetic-spring actuated carbon pile regulator having an electromagnet, a carbon pile having one end fixed relative to the magnet, a spring engaging the other and movable end of the carbon pile to compress the same, and an armature connected to the movable end of the carbon pile and spring for opposing the action of the spring upon energization of the electromagnet, a dash pot comprising a cylinder closed at one end, means for mounting the cylinder in fixed relation to the electromagnet, a piston in said cylinder having its circumferential edge of rounded configuration to permit wabbling in the cylinder, said piston being positioned in close proximity to the closed end of the cylinder and having no clearance between the same and the closed end of the cylinder when at the end of its stroke, and a piston rod connected to the armature and having a ball and socket connection with the piston to permit wabbling of the piston.

6. An electric regulator for use with an alternating current supply comprising a carbon pile resistance, an electromagnet fixed to one end of said pile, an armature for said electromagnet attached to the other and movable end of said pile, a spring bearing on said movable end of the pile to compress the pile in opposition to the pull of the electromagnet when excited, said spring and the movable parts constituting a vibratory system capable of responding to alternating forces of the frequency of said alternating current supply, and a dash pot including a cylinder fixed to said magnet, a piston rod attached to said armature and a piston universally jointed upon the piston rod, the range of movement of said piston during working extending from the closed end of said cylinder.

7. An electric regulator according to claim 6 in which the piston is a disc with its circumferential edge rounded.

8. An electric regulator comprising an electromagnet having a wound central core and a surrounding annular pole piece and an armature in close proximity to said core and pole piece, a carbon pile having one end fixed to the electromagnet and the other and movable end attached to the electromagnet armature, a spring compressing said pile in opposition to the pull of the electromagnet when excited, said spring, armature and movable part of said pile constituting a vibratory system, a dash pot cylinder attached to said electromagnet of a diameter several times the diameter of the electromagnet, and a piston fitting said cylinder and flexibly connected with said armature, the contact of said piston with the cylinder end positively limiting movement of said armature towards said core and pole piece.

9. An electric regulator according to claim 8 in which the piston is a disc with its circumferential edge rounded.

10. An electric regulator according to claim 8 in which the piston is a disc with its circumferential edge rounded and is connected to the piston rod by a ball and socket joint adjacent the plane of contact of piston and cylinder end.

FREDERICK NEWTON.